US009129190B1

(12) United States Patent
Ranzato

(10) Patent No.: US 9,129,190 B1
(45) Date of Patent: Sep. 8, 2015

(54) IDENTIFYING OBJECTS IN IMAGES

(71) Applicant: Google Inc., Mountain View, CA (US)

(72) Inventor: Marc'Aurelio Ranzato, San Francisco, CA (US)

(73) Assignee: Google Inc., Mountain View, CA (US)

( * ) Notice: Subject to any disclaimer, the term of this patent is extended or adjusted under 35 U.S.C. 154(b) by 89 days.

(21) Appl. No.: 14/096,234

(22) Filed: Dec. 4, 2013

(51) Int. Cl.
*G06K 9/62* (2006.01)

(52) U.S. Cl.
CPC .................................. *G06K 9/6255* (2013.01)

(58) Field of Classification Search
USPC .......................................................... 382/156
See application file for complete search history.

(56) References Cited

PUBLICATIONS

LeCun et al., "A tutorial on energy-based learning," Predicting Structured Data, 2006.*
Rowley et al., "Neural network based face detection," IEEE Transactions on Pattern Analysis and Machine Intelligence, 1998.*
Osadchy et al., "Synergistic face detection and pose estimation with energy-based models," J of Machine Learning Research, 2007, 8:1197-1215.*
Elder et al., "Pre-Attentive and Attentive Detection of Humans in Wide-Field Scenes," *Int. Journal of Computer Vision*, 2007, 72:47-66.
Erichsen and Woodhouse, "Human and animal vision," *Machine Vision Handbook*, accessed Dec. 5, 2013, http://www.springerreference.com/docs/html/chapterbid/318221.html, 21 pages.
Felzenszwalb et al., "Cascade object detection with deformable part models," *IEEE Conference on Computer Vision and Patter Recognition*, 2010.
Freeman and Simoncelli, "Metamers of ventral stream," *Nature Neuroscience*, 2011, 14(9):1195-1201.
Goferman et al., "Context-aware saliency detection," *IEEE Trans. On Pattern Analysis and Machine Intelligence*, 2012, 34(10):1915-1926.
Itti et al., "A model of saliency-based visual attention for rapid scene analysis," *IEEE Trans. Pattern Analysis and Machine Intelligence*, 1998, 20(11):1254-1259.
Kanan and Cottrell, "Robust classification of objects, faces and flowers using natural image statistics," *IEEE Computer Vision and Pattern Recognition*, 2010.
Kavukcuoglu et al., "Fast inference in sparse coding algorithms with application to object recognition," *Technical report, Computational and Biological Learning Lab*, NYU, 2008.
Krizhevshky et al., "Imagenet classification with deep convolutional neural networks," *NIPS*, 2012.

(Continued)

*Primary Examiner* — Gregory F Cunningham
(74) *Attorney, Agent, or Firm* — Fish & Richardson P.C.

(57) ABSTRACT

Methods, systems, and apparatus, including computer programs encoded on computer storage media, for identifying objects in images. One of the methods includes obtaining a first training image; down-sampling the first training image to generate a low-resolution first training image; processing the low-resolution first training image using a first neural network to generate a plurality of features of the low-resolution first training image and first scores for the low-resolution first training image; processing the first scores and the features of the low-resolution first training image using an initial patch locator neural network to generate an initial location of an initial patch of the first training image; locally perturbing the initial location to select an adjusted location for the initial patch of the first training image; and updating the current values of the parameters of the initial patch locator neural network to generate updated values using the adjusted location.

24 Claims, 7 Drawing Sheets

(56) References Cited

PUBLICATIONS

Larochelle and Hinton, "Learning to combine foveal glimpses with a third-order boltzmann machine," *Advances in Neural Information Processing Systems*, 2010.

Lazebnik et al., "Beyond bags of features: Spatial pyramid matching for recognizing natural scene categories," *IEEE Conference on Computer Vision and Pattern Recognition*, Jun. 2006.

LeCun et al., "Gradient-based learning applied to document recognition," *Proceedings of the IEEE*, 1998, 86(11):2278-2324.

LeCun et al., "The MNIST Database of handwritten digits," accessed Dec. 5, 2013, http://yann.lecun.com/exdb/mnist/, 8 pages.

Renninger et al., "An information maximization model of eye movements," *Advances in Neural Information Processing Systems*, 2005.

Viola and Jones, "Rapid object detection using a boosted cascade of simple features," *IEEE Conference on Computer Vision and Pattern Recognition*, 2001.

\* cited by examiner

IDENTIFYING OBJECTS IN IMAGES

BACKGROUND

This specification relates to identifying objects in images.

Image classification systems can identify objects in images, i.e., classify input images as including objects from one or more object categories. Some image classification systems use one or more neural networks to classify an input image.

Neural networks are machine learning models that employ one or more layers of models to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

In general, one innovative aspect of the subject matter described in this specification can be embodied in methods that include the actions of receiving an input image having a first resolution; down-sampling the input image to generate a second image having a second, lower resolution; generating a respective first score for each of a plurality of object categories, wherein the respective first score for each of the plurality of object categories represents a likelihood that the second image contains an image of an object belonging to the object category; selecting an initial patch of the input image by processing a plurality of features of the second image and the first scores; generating a respective second score for each of the plurality of object categories, wherein the respective second score for each of the plurality of object categories represents a likelihood that the initial patch contains an image of an object belonging to the object category; and generating a respective third score for each of the plurality of object categories from the first scores and the second scores, wherein the respective third score for each of the plurality of object categories represents a likelihood that the input image contains an image of an object belonging to the object category.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. Generating the first scores can include: processing the second image using a first neural network having a plurality of layers to generate the respective first scores for the object categories, wherein processing the second image using the first neural network comprises receiving a respective input at each of the plurality of layers and producing a respective output based on a set of parameters of the layer, wherein the features of the second image are the output of a pre-determined layer of the plurality of layers, and wherein selecting the initial patch comprises: processing the third scores and the output of the pre-determined layer to determine the coordinates of a reference point in the input; and selecting a patch of the input image centered at the reference point.

Processing the third scores and the output of the pre-determined layer to determine the coordinates of the reference point can include: processing the third scores and the output of a pre-determined layer of the plurality of layers using a second neural network to generate a prediction for the coordinates of the reference point. Generating a respective third score for each of the plurality of object categories from the first scores and the second scores can include: for each object category, combining the first score for the object category and the second score for the object category to generate the third score for the object category.

Combining the first score for the object category and the second score for the object category can include computing a geometric mean of the first score and the second score. Generating a respective second score for each of the plurality of object categories can include: processing the initial patch using a third neural network having a plurality of layers to generate the respective second scores for the object categories, wherein processing the initial patch using the second neural network comprises receiving a respective input at each of the plurality of layers and producing a respective output based on a set of parameters of the layer.

The method can further include: processing the features of the second image, the first scores, and the second scores using a fourth neural network having a plurality of layers to select an additional patch of the input image; and processing the additional patch using a fifth neural network having a plurality of layers to generate a respective fourth score for each of the object categories, wherein processing the additional patch using the fifth neural network comprises receiving a respective input at each of the plurality of layers and producing a respective output based on a set of parameters of the layer. Generating a respective third score for each of the plurality of object categories can include: for each object category, combining the first score for the object category, the second score for the object category, and the fourth score for the object category to generate the third score for the object category.

In general, another innovative aspect of the subject matter described in this specification can be embodied in methods for training an image classification system to classify an input image by minimizing a loss function, wherein the image classification system comprises a first neural network that generates, from a low-resolution image generated from the input image, a respective first score for each of a plurality of object categories that represents a likelihood that the low-resolution image contains an image of an object belonging to the object category, a second neural network that generates, from an initial patch of the input image, a respective second score for each of the object categories that represents a likelihood that the initial patch contains an image of an object belonging to the object category, and an initial patch locator neural network that generates a predicted location of the initial patch of the input image from features of the low-resolution image and from the first scores for the input image. The methods include the actions of obtaining a first training image, wherein the first training image includes an image of a first object from a first object category; obtaining current parameter values for parameters of the first neural network, parameters of the second neural network, and parameters of the initial patch locator neural network; down-sampling the first training image to generate a low-resolution first training image; processing the low-resolution first training image using the first neural network to generate a plurality of features of the low-resolution first training image and first scores for the low-resolution first training image in accordance with the current values of the parameters of the first neural network; processing the first scores for the low-resolution first training image and the features of the low-resolution first training image using the initial patch locator neural network to generate an initial location of an initial patch of the first training image in accordance with current values of the parameters of the initial patch locator neural network; locally perturbing the initial location to select an adjusted location for the initial patch of the first training image from among a plurality of candidate locations in the first training image; and updating the current values of the parameters of the initial patch locator neural network to generate updated values using the adjusted location, wherein processing the first scores for the low-resolution first training image and the features of the low-resolution first training image using the initial patch locator neural in accordance with the adjusted values of the parameters of the initial patch locator neural network generates an alternative predicted location having a smaller distance from the adjusted location than a distance between the predicted location and the adjusted location.

Other embodiments of this aspect include corresponding computer systems, apparatus, and computer programs recorded on one or more computer storage devices, each configured to perform the actions of the methods.

These and other embodiments can each optionally include one or more of the following features. The method can further include: performing an iteration of a stochastic gradient descent training procedure on the loss function while fixing the values of the initial patch locator neural network to generate updated values of the parameters of the first neural network and the second neural network while maintaining the adjusted values of the parameters of initial patch locator neural network.

The loss function can satisfy, for the first training image X:

$$L(\theta_0, \theta_1; X, z, y^*) = E_0(\overline{X}, y^*; \theta_0) + E_1(X(z), y^*; \theta_1) + \frac{\lambda}{2}\|l^{P_1} - z\|^2,$$

wherein $\theta_0$ denotes parameters of the low-resolution neural network, $\theta_1$ denotes parameters of the initial patch neural network, $X(z)$ is the high resolution patch extracted at the alternate location z, $l^{P_1}$ is the initial location, $\overline{X}$ is the low-resolution first training image, $y^*$ is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, and $\|l^{P_1}-z\|^2$ measures the distance between the alternate location z and the predicted location $l^{P_1}$.

The method can further include: obtaining a second training image; and performing another iteration of the stochastic gradient descent training procedure on the loss function using the second training image, comprising: down-sampling the second training image to generate a low-resolution second training image; processing the low-resolution second training image using the first neural network to generate first scores for the low-resolution second training image in accordance with the updated values of the parameters of the first neural network; processing the first scores for the low-resolution second training image and the features of the low-resolution second training image using the initial patch locator neural network to generate an initial location of an initial patch of the second training image in accordance with the updated values of the parameters of the initial patch locator neural network; locally perturbing the initial location of the initial patch of the second training image to select an adjusted location for the initial patch of the second training image; providing the adjusted location for the initial patch of the second training image as the location of the initial patch in the second training image in place of the predicted location of the initial patch in the second training image; processing the initial patch in the second training image located at the reference location using the second neural network to generate second scores for the initial patch in the second training image; and combining the first scores and the second scores to generate respective third scores for the training image, wherein the respective third score for each category represents a likelihood that the training image includes an image of an object from the category.

Locally perturbing the predicted location to select an adjusted location for the initial patch of the first training image can include: identifying a plurality of candidate locations in the training image; determining a respective value of the loss function for each of the candidate locations, wherein determining the value of the loss function for the candidate location comprises computing a value of the loss function with the candidate location replacing the predicted location; and selecting a candidate location that has a smallest respective value of the loss function of any candidate location as the adjusted location. The plurality of candidate locations can be locations in a grid of locations centered at the predicted location in the training image. The loss function can satisfy, for the first training image X:

$$L(\theta_0, \theta_1; X, z, z^-, y^*) = \\ E_0(\overline{X}, y^*; \theta_0) + E_1(X(z), y^*; \theta_1) + E_1(X(z^-), y^*; \theta_1) + \frac{\lambda}{2}\|l^{P_1} - z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{P_1}$ is the initial location, $\overline{X}$ is the low-resolution first training image, $y^*$ is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, $\|l^{P_1}-z\|^2$ measures the distance between the alternate location z and the predicted location $l^{P_1}$, $z^-$ is a most-offending candidate location of the plurality of candidate locations, and $E_1(X(z^-),y;^*\theta_1)$ is a cross-entropy loss at the most-offending candidate location.

Computing a value of the loss function with the candidate location replacing the predicted location can include computing candidate category scores for the first training image with the candidate location replacing the predicted location, and the method can further include: identifying as the most-offending candidate location a candidate location having a highest category score for any incorrect category among any category score for any incorrect category computed with any of the plurality of candidate locations replacing the predicted location.

Particular embodiments of the subject matter described in this specification can be implemented so as to realize one or more of the following advantages. The amount of computation necessary to classify an image as including an object from an object category can increase with the complexity of the input image rather than with the number of pixels in the input image. Thus, amount of computation necessary to classify many images can be reduced, even if those images have a large number of pixels. An image classification system can be trained so that the trained system can more accurately classify images of objects whose appearance may vary between input images. The image classification system can classify an object in an image in a manner that is invariant to translations of the object in the image. That is, the system can accurately classify two images that contain images of the same object but at different positions in the image. Additionally, by classifying input images in a manner that is similar to the human visual system, the classifications produced by the image classification system may be scalable to very high resolution images.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers that can classify an input image as including an image of an object from a particular object category. In particular, the system classifies the input image by using classifications for a low-resolution version of the input image and classifications for one or more patches of the input image at its original resolution that are selected by the system.

This specification also describes techniques for training the components of the system to classify images. In particular, the system can determine trained values for the parameters of each of the components of the system by performing multiple iterations of a two-phase training procedure. In the first phase of the procedure, the system adjusts the parameters of a patch locator neural network that predicts the location of a patch in the input image. In the second phase of the procedure, the system fixes the parameter values of the patch locator neural network and adjusts the parameters of the remaining components of the system.

Figure 1:
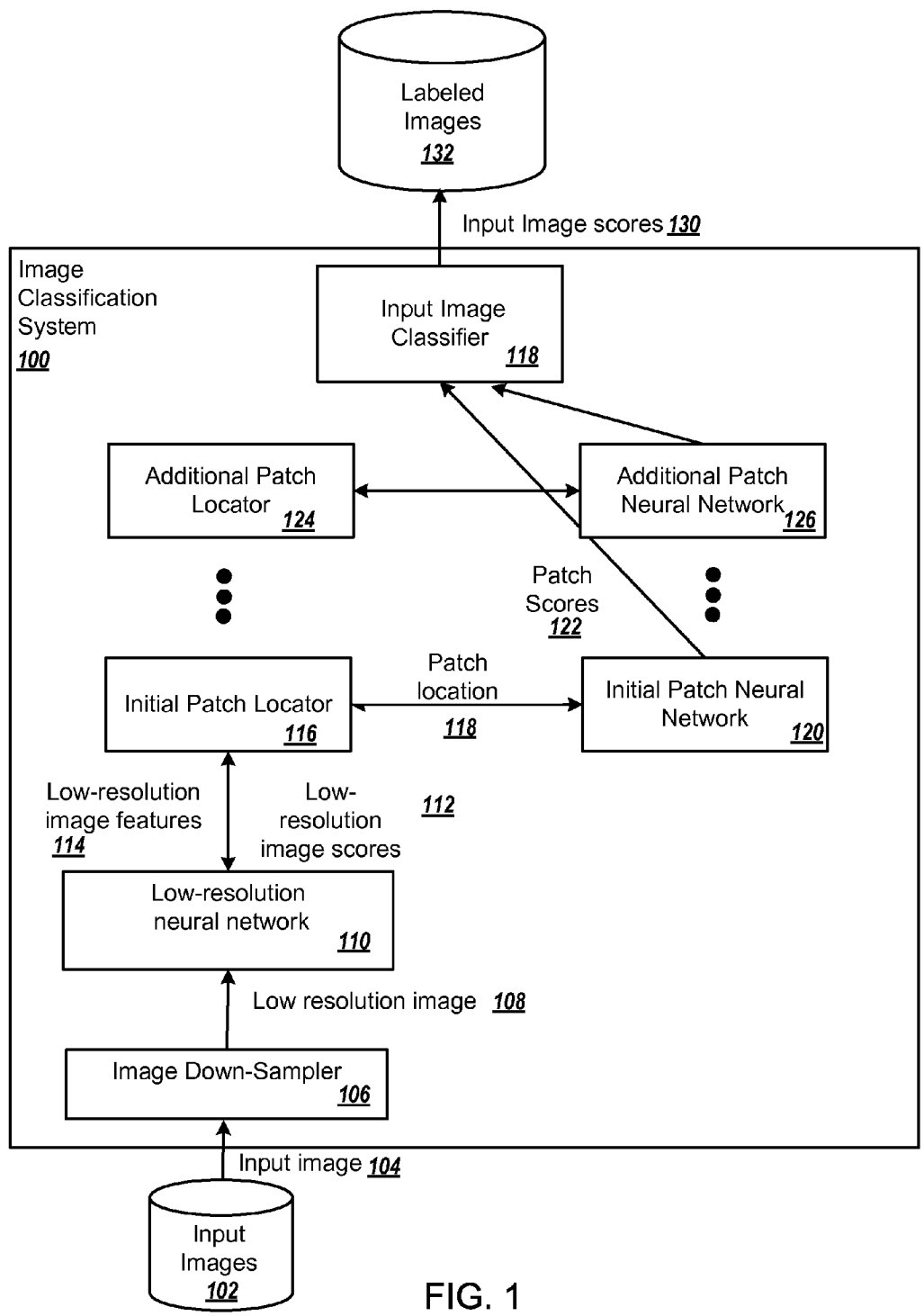
FIG. 1 shows an example image classification system.

FIG. 1 shows an example image classification system 100. The image classification system 100 is an example of a system implemented as computer programs on one or more computers in one or more locations, in which the systems, components, and techniques described below can be implemented.

The image classification system 100 receives input images, e.g., an input image 104 from an input image database 102, and, for each input image, generates a respective score for each object category of a pre-determined set of object categories. For example, the image classification system 100 can generate input image scores 130 for the input image 104. The score for a given category represents a likelihood that the input image includes an image of an object in the category. For example, if one of the object categories is horses, the score for the horses category represents a likelihood that the input image contains an image of a horse. The object categories may be generic, e.g., horses, or specific, e.g., George Washington. As another example, the object categories may include a generic numbers category or specific categories for each of the digits zero through nine.

Once the scores for a given input image are generated, the image classification system 100 may store the input image in a labeled image database 132. For example, the system may store the image in association with a label for the category that has the highest category score or in association with multiple labels, e.g., with a label for each category that has a category score over a threshold value. For example, if input images received by the system include images of handwritten digits and the categories include specific categories for each of the digits zero through nine, the system may associate each input image with a label that identifies the digit that the system predicts is pictured in the input image.

The image classification system 100 includes an image down-sampler 106 that down-samples input images to generate low-resolution images, e.g., a low-resolution image 108 generated by down-sampling the input image 104.

Once the low-resolution image is generated, the image classification system 100 provides the image as input to a low-resolution neural network 110 that receives the image and generates respective low-resolution image scores for each of the object categories, e.g., low-resolution image scores 112 for low-resolution image 108. The low-resolution image score for a given category represents a likelihood that the low-resolution image includes an image of the object in the category.

The low-resolution neural network 110 includes one or more hidden layers and an output layer that receives input from the last hidden layer and generates the low-resolution image scores. As will be described in more detail below with reference to FIG. 3, the low-resolution neural network 110 generates a set of features from the low-resolution image, e.g., low-resolution image features 114 generated from low-resolution image 108, as part of generating the low-resolution image scores.

The image classification system 100 uses the low-resolution image features and the low-resolution image scores to predict a location of an initial high-resolution patch in the input image. In particular, the image classification system 100 provides the low-resolution image features and the low-resolution image scores as input to an initial patch locator 116. The initial patch locator 116 is a neural network that receives as input the low-resolution image features and the low-resolution image scores, e.g., the low-resolution image features 114 and the low-resolution image scores 112, and predicts a location of an initial patch of pre-determined size in an input image, e.g., the location 118 of an initial patch in the input image 104.

The image classification system 100 generates category scores for the initial patch using a patch neural network 120. The patch neural network 120 is a neural network that receives as input a patch of an input image at its original resolution and outputs a respective patch score for each of the object categories, e.g., patch scores 122 for the initial patch of input image 104. The patch score for a given category represents a likelihood that the patch includes an image of the object in the category. Optionally, the patch neural network 120 can also receive the patch at a lower resolution, i.e., a down-sampled version of the high-resolution patch for use in generating the patch scores.

In some circumstances, the image classification system 100 uses the scores for the initial patch and the scores for the low-resolution image, e.g., the patch scores 122 and the low-resolution image scores 112, to generate the category scores for the input images by providing the patch scores and the low-resolution image scores to an input image classifier 128. The input image classifier receives as input the patch scores and the low-resolution image scores and generates category scores for the input image, e.g., the input image scores 130 for the input image 104.

Optionally, however, the image classification system 100 can include one or more additional patch locators, e.g., a patch locator 124, and a corresponding additional patch neural network for each additional patch locator, e.g., patch neural network 126. Each additional patch locator predicts a location of patch of the input image from the low-resolution image features and the low-resolution image scores generated using the low-resolution neural network 110, as well as the patch scores generated by each patch neural network that corresponds to a preceding patch locator in the image classification system 100.

Each additional patch neural network generates patch scores for the patch located at the location predicted by the corresponding additional patch locator. When the image classification system 100 includes more than one patch neural network, the image classification system 100 provides the patch scores generated by each of the patch neural networks as input to the input image classifier 118 in addition to the low-resolution image scores generated by the low-resolution network 110. The input image classifier 118 can then combine the low-resolution image scores and the multiple sets of patch scores to generate the category scores for the input image.

In some implementations, the image classification system 100 may determine not to use all of the patch neural networks that are included in the system for a given input image. Determining whether to use additional patches for an image is described in more detail below with reference to FIG. 5.

In some implementations, the image classification system 100 does not include an input image classifier 118. In these implementations, each patch neural network included in the image classification system 100 combines the low-resolution image scores, the patch scores produced by the patch neural network, and the patch scores produced by each preceding patch neural network to generate the category scores for the input image. The category scores generated by the final patch neural network that is being used for a given input image can then be used as the final category scores for the input image.

Figure 2:
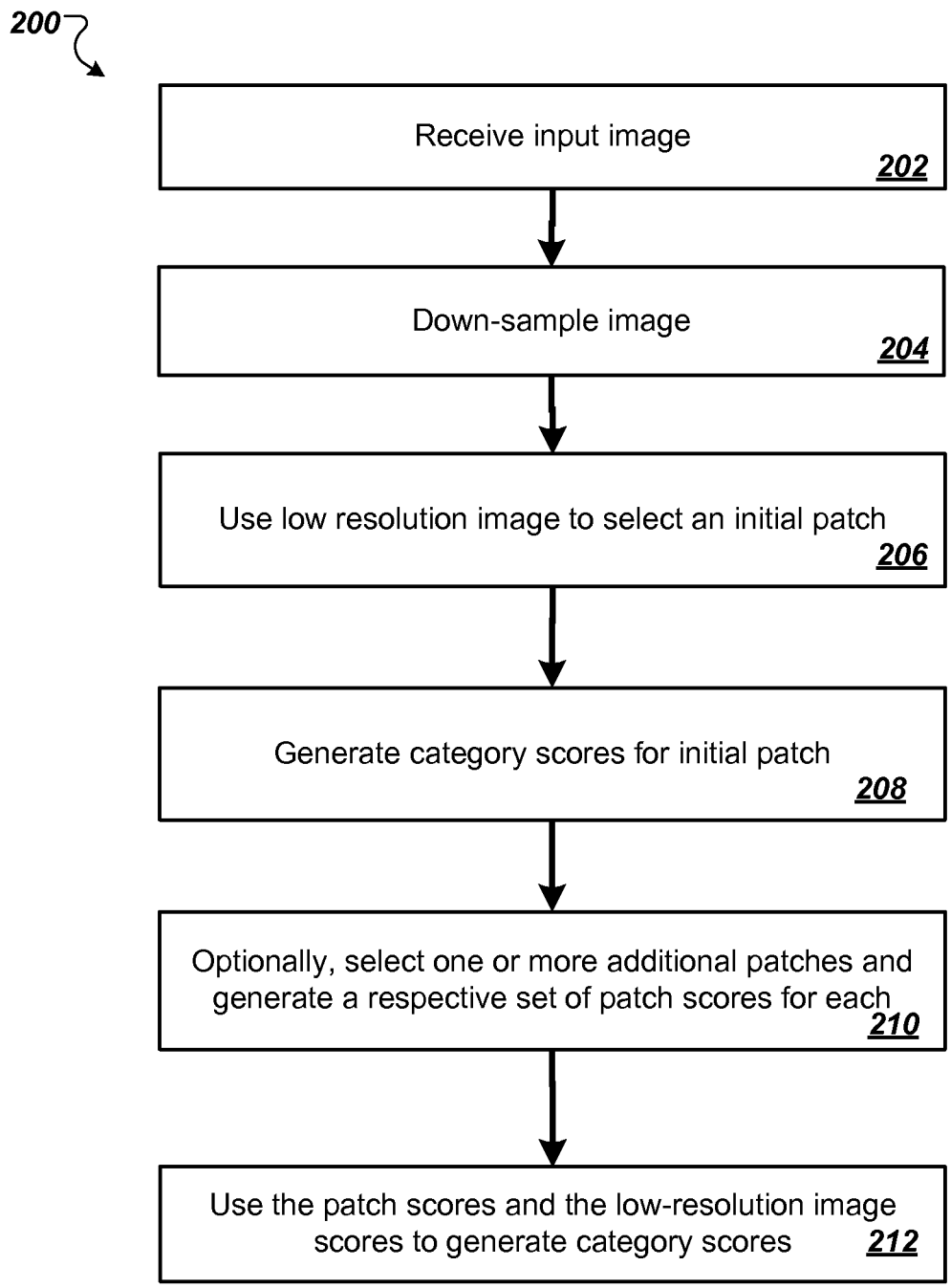
FIG. 2 is a flow diagram of an example process for generating category scores for an input image.

FIG. 2 is a flow diagram of an example process 200 for generating category scores for an input image. For convenience, the process 200 will be described as being performed by a system of one or more computers located in one or more locations. For example, an image classification system, e.g., the image classification system 100 of FIG. 1, appropriately programmed in accordance with this specification, can perform the process 200.

The system obtains an input image (step 202) and down-samples the input image (step 204) to generate a low-resolution image. The system can down-sample the input images using conventional down-sampling techniques.

The system uses the low resolution image to select an initial patch of the input image (step 206). In particular, the location of the initial patch is determined by a patch locator neural network using features of the low-resolution image and low-resolution image scores obtained from a low-resolution neural network. The low-resolution image scores are a set of scores that includes a respective score for each of a pre-determined set of object categories. Determining the location of the initial patch is described in more detail below with reference to FIG. 3.

The system generates category scores for the initial patch (step 208) by processing the initial patch using an initial patch neural network, e.g., the initial patch neural network 120 of FIG. 1. The initial patch neural network is a neural network that has one or more hidden layers and an output layer, each of which have a respective set of parameters. The initial patch neural network receives the initial patch of the input image and generates a respective patch score for each of the categories. The patch score for a given category represents a likelihood that the initial patch includes an image of an object belonging to the category.

Optionally, the system selects one or more additional patches of the input image and generates a respective set of patch scores for each of the additional patches (step 210). Each additional patch is selected using a respective additional patch locator, e.g., the additional patch locator 124 of FIG. 1, and the patch scores for the additional patch are generated using a corresponding patch neural network, e.g., the additional patch neural network 126 of FIG. 1. While each patch neural network receives an image patch as an input and outputs a set of patch scores for the image patch, some or all of the patch neural networks may have one or more of different parameter values from other patch neural networks, different numbers of features in a given layer from other patch neural networks, or a different number of layers from other patch neural networks. Determining a location of an additional patch is described in more detail below with reference to FIG. 4.

The system uses the sets of patch scores and the low-resolution image scores to generate category scores for the input image (step 212). That is, the system provides the patch scores and the low-resolution image scores to an input image classifier, e.g., the input image classifier 118 of FIG. 1. The input image classifier receives the patch scores and the low-resolution image scores and generates category scores for the input image from the received scores. For example, the input image classifier may compute the category score for a given category by computing the geometric mean of the low-resolution image score for that category and the patch scores for that category. Optionally, after the geometric mean is computed, the system can normalize the resulting scores and use the normalized scores as the category scores.

In some implementations, rather than the input image classifier generating the category scores, each patch neural network can generate current category scores using the low-resolution scores, the patch scores generated by the patch neural network, and the patch scores generated by each preceding patch neural network. In some implementations, the system determines whether to use the current category scores as the category scores for the input image, e.g., as described below with reference to FIG. 5.

Figure 3:
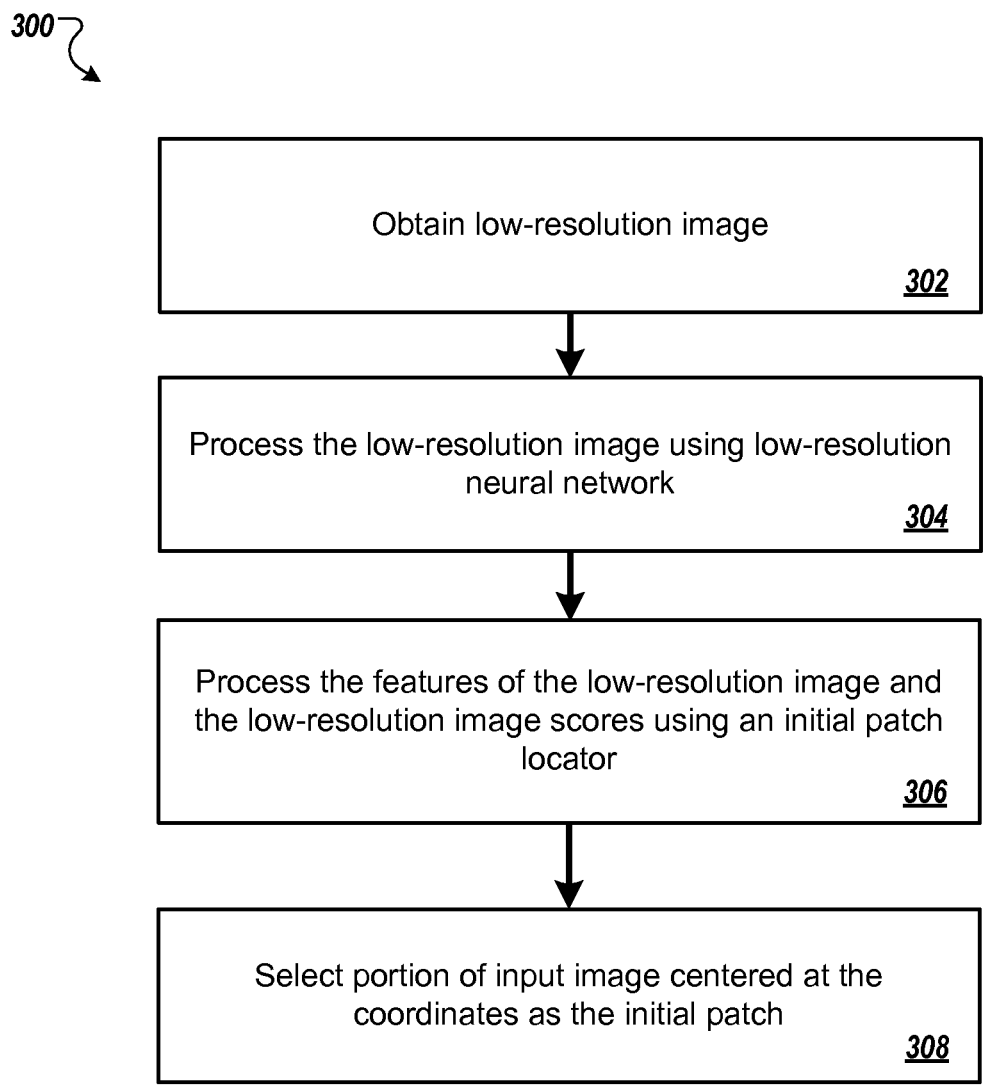
FIG. 3 is a flow diagram of an example process for determining a location of an initial image patch in an input image from a low-resolution image.

FIG. 3 is a flow diagram of an example process 300 for determining a location of an initial image patch in an input image from a low-resolution image. For convenience, the process 300 will be described as being performed by a system of one or more computers located in one or more locations. For example, an image classification system, e.g., the image classification system 100 of FIG. 1, appropriately programmed in accordance with this specification, can perform the process 300.

The system obtains a low-resolution version of the input image (step 302). The low-resolution image was generated from the input image by down-sampling the input image.

The system processes the low-resolution image using a low-resolution neural network, e.g., the low-resolution network 110 of FIG. 1 (step 304). The low-resolution neural network has one or more hidden layers and an output layer and generates, from the low resolution image, a set of low-resolution image scores, i.e., a respective score for each of the predetermined set of categories that represents a likelihood that the low-resolution image includes an image of an object in the corresponding category. Each of the layers of the low-resolution neural network has a respective set of parameters and produces a respective output from a received input in accordance with the parameters.

As part of processing the low-resolution image to generate the scores for the low-resolution image, the low-resolution network produces a set of features of the low-resolution image. For example, the features may be the output of one of the hidden layers of the low-resolution neural network, i.e., the features may be passed as input to a next hidden layer or to the output layer of the low-resolution neural network. Rather than discarding the features, the low-resolution image may preserve them for later use.

The system processes the features of the low-resolution image and the low-resolution image scores using an initial patch locator, e.g., the initial patch locator 116 of FIG. 1 (step 306). The initial patch locator is a neural network that receives the low-resolution image features and the low-resolution image scores and outputs coordinates in the input image in accordance with a set of parameters.

The system selects a portion of the input image centered at the coordinates as the initial patch (step 308). For example, the system can select as the additional patch the portion of the image that is within a square or a rectangle having pre-determined dimensions and being centered at the coordinates generated by the initial patch locator. In some implementations, rather than the dimensions being pre-determined, the initial patch locator may be configured to output height and width values for the patch. The patch locator may also be configured to predict other properties of the initial patch, e.g., the rotation and the scale of the patch.

Figure 4:
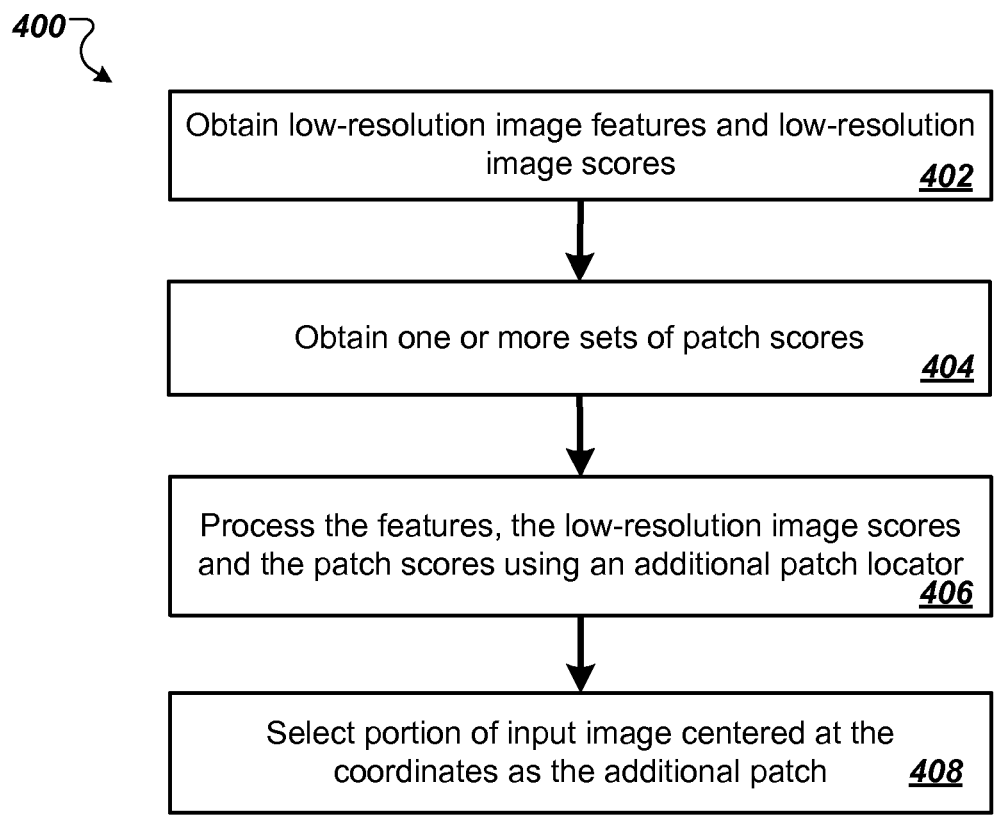
FIG. 4 is a flow diagram of an example process for determining a location of an additional image patch in an input image.

FIG. 4 is a flow diagram of an example process 400 for determining a location of an additional image patch in an input image. For convenience, the process 400 will be described as being performed by a system of one or more computers located in one or more locations. For example, an image classification system, e.g., the image classification system 100 of FIG. 1, appropriately programmed in accordance with this specification, can perform the process 400.

The system obtains low-resolution image features and low-resolution image scores for a low-resolution version of an input image (step 402).

The system obtains one or more sets of patch scores for one or more other patches of the input image (step 404). Each set of patch scores includes a respective patch score for each of a predetermined set of categories. The patch score for a given category represents a likelihood that the corresponding other patch includes an image of an object belonging to the category.

The system processes the low-resolution image features, low-resolution image scores, and the one or more sets of patch scores using an additional patch locator, e.g., the additional patch locator 124 of FIG. 1, that is specific to the patch (step 406). The additional patch locator is a neural network that takes as an input the low-resolution image features, low-resolution image scores, and the one or more sets of patch scores, and outputs coordinates in the input image in accordance with a set of parameters.

The system selects a portion of the input image centered at the coordinates as the additional patch (step 408). For example, the system can select as the additional patch the portion of the image that is within a square or a rectangle having pre-determined dimensions and being centered at the coordinates generated by the additional patch locator.

Figure 5:
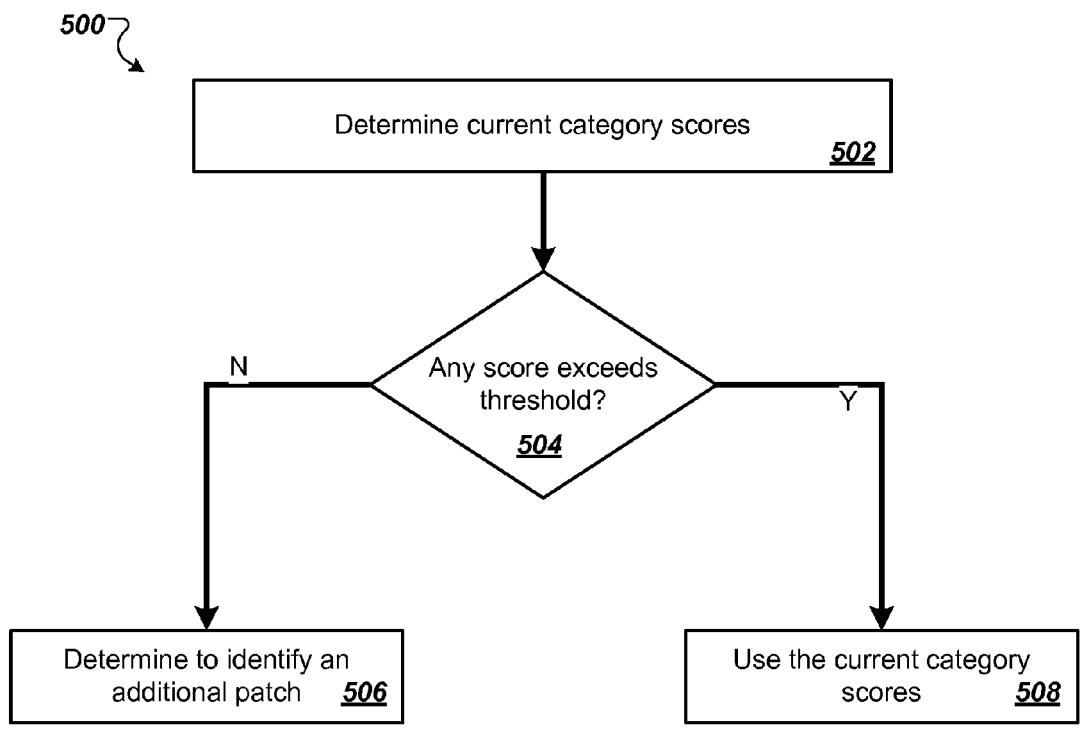
FIG. 5 is a flow diagram of an example process for determining whether to identify an additional image patch for an input image.

FIG. 5 is a flow diagram of an example process 500 for determining whether to identify an additional patch for an input image. For convenience, the process 500 will be described as being performed by a system of one or more computers located in one or more locations. For example, an image classification system, e.g., the image classification system 100 of FIG. 1, appropriately programmed in accordance with this specification, can perform the process 500.

The process 500 may be performed after the patch scores for each patch of the input image have been generated. That is, the system may initially perform the process after the patch scores for the initial patch of the input image have been generated and subsequently perform the process 500 after the patch scores for each additional patch of the image are generated. Optionally, the system may also perform the process 500 after the low-resolution image scores are generated and before any patch scores have been generated for the image.

The system determines current category scores for the input image (step 502). The system combines the low resolution scores for the input image with any patch scores that have been generated for the input image to generate the current category scores. If no patch scores have been generated, the system uses the low resolution scores as the current category scores.

The system determines whether the current category score for any of the categories exceeds a threshold value (step 504). For example, the system may determine whether any of the category scores exceed 0.9, 0.95, or 0.975.

If none of the current category scores exceed the threshold score, the system determines to identify an additional patch of the input image, i.e., to generate additional patch scores for an additional patch of the input image and use the additional patch scores in computing the category scores for the image (step 506).

If any of the current category scores exceed the threshold score, the system uses the current category scores as the category scores for the input image (step 508). That is, the system determines not to identify any additional patches of the input image.

The processes 200, 300, 400, and 500 can be performed to classify an image for which the desired classification is not known, i.e., an input image that has not yet been classified as including images of any objects. The processes 200, 300, and 400 can also be performed to classify an input image from a set of training data, i.e., a set of input images for which the output that should be predicted by the system is known, in order to train the system, i.e., to determine trained values for the parameters of components of the system. For example, the processes can be performed on inputs selected from a set of training data as part of a training technique that includes performing multiple iterations of a two-phase training procedure to determine respective trained values for the parameters of the low-resolution neural network and for each of the patch locators and patch neural networks that are included in the system.

In some implementations, when the system includes only an initial patch locator and no additional patch locators, the parameters of the system are trained by minimizing a loss function defined by, for a given training image X:

$$L(\theta_0, \theta_1; X, z, y^*) = E_0(\overline{X}, y^*; \theta_0) + E_1(X(z), y^*; \theta_1) + \frac{\lambda}{2}\|1^{p_1} - z\|^2$$

where $\theta_0$ denotes the parameters of the low-resolution neural network, $\theta_1$ denotes the parameters of the initial patch neural network, $X(z)$ is the high resolution patch extracted at location z, $l^{p_1}$ is the predicted patch location, $\overline{X}$ is a low resolution version of the input image X, $y^*$ is the known label of the input image X, $\lambda$ is a positive constant value, $E_0(\overline{X},y^*;\theta_0)$ is the cross-entropy error of the low-resolution network, $E_1(X(z), y^*;\theta_1)$ is the cross-entropy error of the initial patch neural network, and $\|l^{p_1}-z\|^2$ measures a distance between a location z and the predicted location $l^{p_1}$. The location z is treated by the system as a latent variable and is selected from among a set of candidate locations that are proximate to the predicted location in the input image. Selecting the location z is described in more detail below with reference to FIG. 6.

In some implementations, the loss function also includes a term that accounts for the cross-entropy error at a most-offending candidate location in the input image. The most-offending candidate location is the candidate location where, had that candidate location been the predicted location, the category score for any incorrect category, i.e., any category different than the known category for the training image, would be the highest among any patch score for any incorrect category that would have been generated had any of the candidate locations been the predicted location. In these implementations, the loss function for the training image X may satisfy:

$$L(\theta_0, \theta_1; X, z, z^-, y^*) =$$
$$E_0(\overline{X}, y^*; \theta_0) + E_1(X(z), y^*; \theta_1) + E_1(X(z^-), y^*; \theta_1) + \frac{\lambda}{2}\|1^{p_1} - z\|^2$$

where $z^-$ is the most-offending candidate location and $E_1(X(z^-),y^*;\theta_1)$ is the cross-entropy loss at the most-offending candidate location. Selecting the most-offending candidate location is described in more detail below with reference to FIG. 6.

In order to train the components of the system using either of the above loss functions, the system may perform multiple iterations of a two-phase training procedure, with one iteration of the two-phase procedure being performed for each training image in the set of training images. In particular, using the two-phase training procedure may be advantageous when minimizing a loss function with a non-differentiable term.

Figure 6:
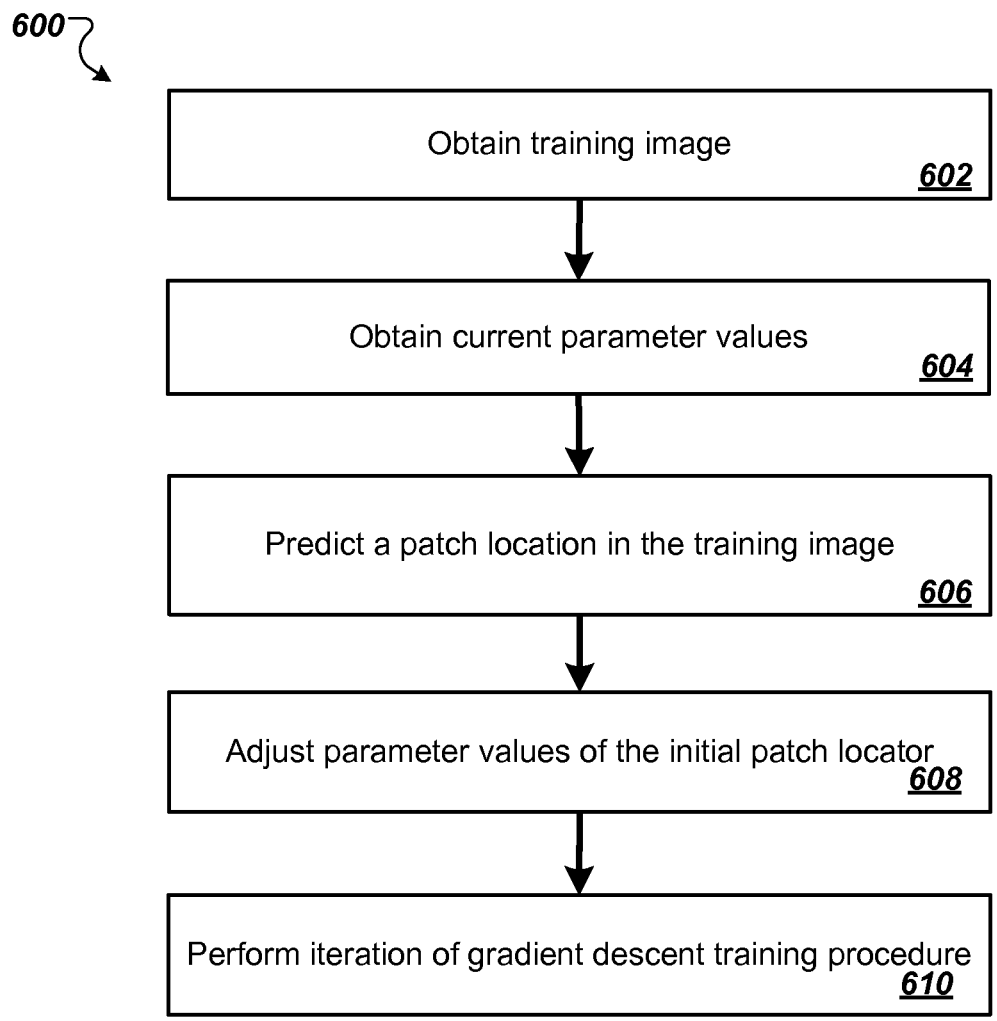
FIG. 6 is a flow diagram of an example process for performing an iteration of a two-phase training procedure.

FIG. 6 is a flow diagram of an example process 600 for performing an iteration of a two-phase training procedure. For convenience, the process 600 will be described as being performed by a system of one or more computers located in one or more locations. For example, an image classification system, e.g., the image classification system 100 of FIG. 1, appropriately programmed in accordance with this specification, can perform the process 600.

The process 600 may be performed as part of a training technique to determine trained parameter values for each component of the system. In particular, as part of the training technique, the system may perform the process 600 for each training image in a set of training images.

The system obtains a training image (step 602). The training image is an image for which the object category of the object that is pictured in the image is known.

The system obtains current parameter values for the components that are to be trained (step 604). That is, the system obtains current values for the parameters of the low-resolution network, the initial patch locator, and the initial patch neural network. If the current iteration of the process 600 is an initial iteration of the training technique, the current parameter values will be initial parameter values. Otherwise, the current parameter values will be the values generated by the previous iteration of the training technique.

In an initial phase of the procedure, the system predicts a location of a patch in the training image using the current parameter values (step 604). For example, the system can predict the location of a patch by down-sampling the image and then processing the resulting low-resolution image using a low-resolution neural network and an initial patch locator, e.g., as described above with reference to the process 300 of FIG. 3.

The system performs a local perturbation on the predicted location to select an adjusted location (step 606). Optionally, the system also selects a most-offending location. Performing a local perturbation to select the adjusted location and, optionally, a most-offending location will be described below with reference to FIG. 6.

The system adjusts the parameter values of the initial patch locator using the adjusted location (step 608). The system adjusts the values of the parameters of the initial patch locator to minimize the loss function. That is, the system adjusts the values of the parameters of the initial patch locator so that processing the low-resolution image scores and the features of the low-resolution image using the adjusted parameter values of the initial patch locator results in an alternative predicted location that has a smaller distance to the adjusted location than the location predicted using the current parameter values. The system can adjust the parameters of the initial patch locator using conventional model training techniques, e.g., by using a back-propagation algorithm with a single step of a gradient descent training procedure.

In the second phase, once the parameter values of the initial patch locator have been adjusted, the system performs an iteration of a gradient descent training procedure on the loss function to adjust the parameter values of the other components of the system (step 610). In particular, during the gradient descent iteration, the system keeps the parameter values of the initial patch locator fixed.

In some implementations, as part of training, after performing multiple iterations of the process 600, the system may train the parameters of the other components of the system further by performing additional iterations of the gradient descent training procedure on additional training images. During the additional iterations, the system sets the desired location z equal to the predicted location $l^{p_1}$, i.e., so that only values of the parameters of the remaining components are adjusted.

Figure 7:
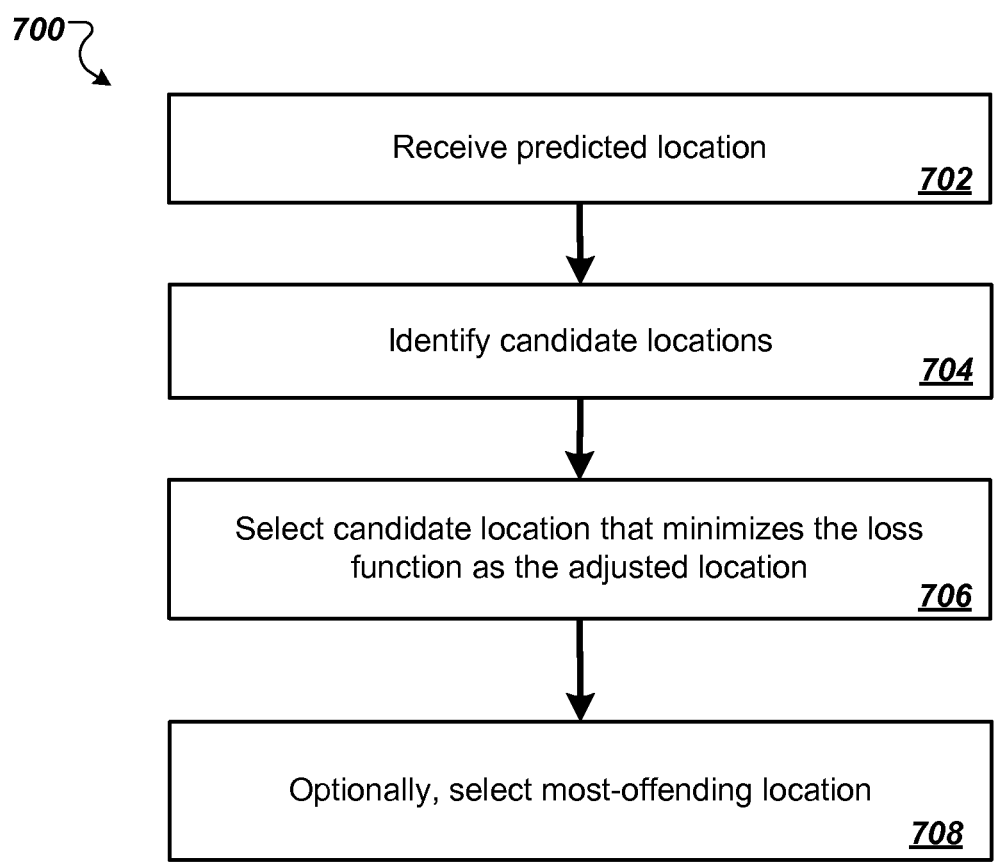
FIG. 7 is a flow diagram of an example process for selecting an adjusted location for an image patch from a predicted patch location.

FIG. 7 is a flow diagram of an example process 700 for selecting an adjusted location for an image patch from a predicted patch location. For convenience, the process 700 will be described as being performed by a system of one or more computers located in one or more locations. For example, an image classification system, e.g., the image classification system 100 of FIG. 1, appropriately programmed in accordance with this specification, can perform the process 700.

The system receives a predicted location for a patch of an input image (step 702).

The system identifies a set of candidate locations in the input image (step 704). The candidate locations are locations that are proximate to the predicted location in the input image. For example, the system may generate a grid of candidate locations centered at the predicted location in the input image, e.g., a three-by-three grid of candidate locations centered at the predicted location. The locations in the grid may be separated by a pre-determined number of pixels, e.g., two, three, or four pixels.

The system selects the candidate location that minimizes the loss function as the adjusted location (step 706). That is, the system determines a respective value of the loss function that the system is being trained on with each of the candidate locations as the predicted location and selects the candidate location that results in the smallest loss function value as the adjusted location.

Optionally, the system also selects a most-offending location from the candidate locations (step 708). That is, as part of determining the respective value of the loss function with each of the candidate locations as the predicted location, the system determines category scores for the input image with each of the candidate locations as the predicted location. The system selects the candidate location for which the category score for any incorrect category is the highest among any category score for any incorrect category for any of the candidate locations.

The process 600 and the process 700 can be used to train a system that has a single patch locator and a single corresponding initial patch neural network. However, in some circumstances, the system will include one or more additional patch locators and a corresponding additional patch neural network for each additional patch locator. When one or more additional patch locators are included, the system initially determines trained values for the system components as if only the initial patch locator was included in the system, i.e., using the process 600. Once trained values for those system components are determined, the system trains each additional patch locator and corresponding patch neural network in sequence, holding the parameters of each earlier patch locator fixed. That is, for a k-th patch, the system fixes the parameters used to determine the first k−1 patches, and adjusts only the parameters of the k-th patch, e.g., using the two-phase training procedure.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for training an image classification system to classify an input image by minimizing a loss function, wherein the image classification system comprises a first neural network that generates, from a low-resolution image generated from the input image, a respective first score for each of a plurality of object categories that represents a likelihood that the low-resolution image contains an image of an object belonging to the object category, a second neural network that generates, from an initial patch of the input image, a respective second score for each of the object categories that represents a likelihood that the initial patch contains an image of an object belonging to the object category, and an initial patch locator neural network that generates a predicted location of the initial patch of the input image from features of the low-resolution image and from the first scores for the input image, the method comprising:

obtaining a first training image, wherein the first training image includes an image of a first object from a first object category;

obtaining current parameter values for parameters of the first neural network, parameters of the second neural network, and parameters of the initial patch locator neural network;

down-sampling the first training image to generate a low-resolution first training image;

processing the low-resolution first training image using the first neural network to generate a plurality of features of the low-resolution first training image and first scores for the low-resolution first training image in accordance with the current values of the parameters of the first neural network;

processing the first scores for the low-resolution first training image and the features of the low-resolution first training image using the initial patch locator neural network to generate an initial location of an initial patch of the first training image in accordance with current values of the parameters of the initial patch locator neural network;

locally perturbing the initial location to select an adjusted location for the initial patch of the first training image from among a plurality of candidate locations in the first training image; and updating the current values of the parameters of the initial patch locator neural network to generate updated values using the adjusted location, wherein processing the first scores for the low-resolution first training image and the features of the low-resolution first training image using the initial patch locator neural network in accordance with the updated values of the parameters of the initial patch locator neural network generates an alternative predicted location having a smaller distance from the adjusted location than a distance between the predicted location and the adjusted location.

2. The method of claim 1, further comprising:

performing an iteration of a stochastic gradient descent training procedure on the loss function while fixing the values of the initial patch locator neural network to generate updated values of the parameters of the first neural network and the second neural network while maintaining the updated values of the parameters of initial patch locator neural network.

3. The method of claim 2, wherein the loss function satisfies, for the first training image X:

$$L(\theta_0,\theta_1;X,z,y^*)=E_0(\overline{X},y^*;\theta_0)+E_1(X(z),y^*;\theta_1)+\lambda/2\|l^{P1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{P1}$ is the initial location, $\overline{X}$ is the low-resolution first training image, $y^*$ is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, and $\|l^{P1}-z\|^2$ measures the distance between the alternate location z and the predicted location $l^{P1}$.

4. The method of claim 2, further comprising:
obtaining a second training image; and
performing another iteration of the stochastic gradient descent training procedure on the loss function using the second training image, comprising:
down-sampling the second training image to generate a low-resolution second training image;
processing the low-resolution second training image using the first neural network to generate first scores for the low-resolution second training image in accordance with the updated values of the parameters of the first neural network;
processing the first scores for the low-resolution second training image and the features of the low-resolution second training image using the initial patch locator neural network to generate an initial location of an initial patch of the second training image in accordance with the updated values of the parameters of the initial patch locator neural network;
locally perturbing the initial location of the initial patch of the second training image to select an adjusted location for the initial patch of the second training image;
providing the adjusted location for the initial patch of the second training image as the location of the initial patch in the second training image in place of the predicted location of the initial patch in the second training image;
processing the initial patch in the second training image located at the reference location using the second neural network to generate second scores for the initial patch in the second training image; and
combining the first scores and the second scores to generate respective third scores for the training image, wherein the respective third score for each category represents a likelihood that the training image includes an image of an object from the category.

5. The method of claim 1, wherein locally perturbing the predicted location to select an adjusted location for the initial patch of the first training image comprises:
identifying a plurality of candidate locations in the training image;
determining a respective value of the loss function for each of the candidate locations, wherein determining the value of the loss function for the candidate location comprises computing a value of the loss function with the candidate location replacing the predicted location; and
selecting a candidate location that has a smallest respective value of the loss function of any candidate location as the adjusted location.

6. The method of claim 5, wherein the plurality of candidate locations are locations in a grid of locations centered at the predicted location in the training image.

7. The method of claim 5, wherein the loss function satisfies, for the first training image X:

$$L(\theta_0,\theta_1;X,z,z^-,y^*)=E_0(\overline{X},y^*;\theta_0)+E_1(X(z),y^*;\theta_1)+E_1(X(z^-),y;*\theta_1)+\lambda/2\|l^{P1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{P1}$ is the initial location, $\overline{X}$ is the low-resolution first training image, $y^*$ is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, $\|l^{P1}-z\|^2$ measures the distance between the alternate location z and the predicted location $l^{P1}$, $z^-$ is a most-offending candidate location of the plurality of candidate locations, and $E_1(X(z^-),y;*\theta_1)$ is a cross-entropy loss at the most-offending candidate location.

8. The method of claim 7, wherein computing a value of the loss function with the candidate location replacing the predicted location comprises computing candidate category scores for the first training image with the candidate location replacing the predicted location, and wherein the method further comprises:
identifying as the most-offending candidate location a candidate location having a highest category score for any incorrect category among any category score for any incorrect category computed with any of the plurality of candidate locations replacing the predicted location.

9. A system for training an image classification system to classify an input image by minimizing a loss function, wherein the image classification system comprises a first neural network that generates, from a low-resolution image generated from the input image, a respective first score for each of a plurality of object categories that represents a likelihood that the low-resolution image contains an image of an object belonging to the object category, a second neural network that generates, from an initial patch of the input image, a respective second score for each of the object categories that represents a likelihood that the initial patch contains an image of an object belonging to the object category, and an initial patch locator neural network that generates a predicted location of the initial patch of the input image from features of the low-resolution image and from the first scores for the input image, the system comprising one or more computers and one or more non-transitory storage devices storing instructions that when executed by the one or more computers cause the one or more computers to perform operations comprising:
obtaining a first training image, wherein the first training image includes an image of a first object from a first object category;
obtaining current parameter values for parameters of the first neural network, parameters of the second neural network, and parameters of the initial patch locator neural network;
down-sampling the first training image to generate a low-resolution first training image;
processing the low-resolution first training image using the first neural network to generate a plurality of features of the low-resolution first training image and first scores for the low-resolution first training image in accordance with the current values of the parameters of the first neural network;

processing the first scores for the low-resolution first training image and the features of the low-resolution first training image using the initial patch locator neural network to generate an initial location of an initial patch of the first training image in accordance with current values of the parameters of the initial patch locator neural network;

locally perturbing the initial location to select an adjusted location for the initial patch of the first training image from among a plurality of candidate locations in the first training image; and updating the current values of the parameters of the initial patch locator neural network to generate updated values using the adjusted location, wherein processing the first scores for the low-resolution first training image and the features of the low-resolution first training image using the initial patch locator neural network in accordance with the updated values of the parameters of the initial patch locator neural network generates an alternative predicted location having a smaller distance from the adjusted location than a distance between the predicted location and the adjusted location.

10. The system of claim 9, the operations further comprising:

performing an iteration of a stochastic gradient descent training procedure on the loss function while fixing the values of the initial patch locator neural network to generate updated values of the parameters of the first neural network and the second neural network while maintaining the updated values of the parameters of initial patch locator neural network.

11. The system of claim 10, wherein the loss function satisfies, for the first training image X:

$$L(\theta_0,\theta_1;X,z,y^*)=E_0(\overline{X},y^*;\theta_0)+E_1(X(z),y^*;\theta_1)+\lambda/2\|l^{p1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{p1}$ is the initial location, $\overline{X}$ is the low-resolution first training image, y* is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, and $\|l^{p1}-z\|^2$ measures the distance between the alternate location z and the predicted location $l^{p1}$.

12. The system of claim 10, the operations further comprising:

obtaining a second training image; and performing another iteration of the stochastic gradient descent training procedure on the loss function using the second training image, comprising:

down-sampling the second training image to generate a low-resolution second training image;

processing the low-resolution second training image using the first neural network to generate first scores for the low-resolution second training image in accordance with the updated values of the parameters of the first neural network;

processing the first scores for the low-resolution second training image and the features of the low-resolution second training image using the initial patch locator neural network to generate an initial location of an initial patch of the second training image in accordance with the updated values of the parameters of the initial patch locator neural network;

locally perturbing the initial location of the initial patch of the second training image to select an adjusted location for the initial patch of the second training image;

providing the adjusted location for the initial patch of the second training image as the location of the initial patch in the second training image in place of the predicted location of the initial patch in the second training image;

processing the initial patch in the second training image located at the reference location using the second neural network to generate second scores for the initial patch in the second training image; and combining the first scores and the second scores to generate respective third scores for the training image, wherein the respective third score for each category represents a likelihood that the training image includes an image of an object from the category.

13. The system of claim 9, wherein locally perturbing the predicted location to select an adjusted location for the initial patch of the first training image comprises:

identifying a plurality of candidate locations in the training image;

determining a respective value of the loss function for each of the candidate locations, wherein determining the value of the loss function for the candidate location comprises computing a value of the loss function with the candidate location replacing the predicted location; and selecting a candidate location that has a smallest respective value of the loss function of any candidate location as the adjusted location.

14. The system of claim 13, wherein the plurality of candidate locations are locations in a grid of locations centered at the predicted location in the training image.

15. The system of claim 13, wherein the loss function satisfies, for the first training image X:

$$L(\theta_0,\theta_1;X,z,z^-,y^*)=E_0(\overline{X},y^*;\theta_0)+E_1(X(z),y^*;\theta_1)+E_1(X(z^-),y;^*\theta_1)+\lambda/2\|l^{p1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{p1}$ is the initial location, $\overline{X}$ is the low-resolution first training image, y* is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, $\|l^{p1}-z\|^2$ measures the distance between the alternate location z and the predicted location $l^{p1}$, $z^-$ is a most-offending candidate location of the plurality of candidate locations, and $E_1(X(z^-),y;^*\theta_1)$ is a cross-entropy loss at the most-offending candidate location.

16. The system of claim 15, wherein computing a value of the loss function with the candidate location replacing the predicted location comprises computing candidate category scores for the first training image with the candidate location replacing the predicted location, and wherein the method further comprises:

identifying as the most-offending candidate location a candidate location having a highest category score for any incorrect category among any category score for any incorrect category computed with any of the plurality of candidate locations replacing the predicted location.

17. A non-transitory computer storage medium encoded with a computer program, the program comprising instructions that when executed by one or more computers cause the one or more computers to perform operations for training an image classification system to classify an input image by minimizing a loss function, wherein the image classification system comprises a first neural network that generates, from a low-resolution image generated from the input image, a respective first score for each of a plurality of object categories that represents a likelihood that the low-resolution image contains an image of an object belonging to the object category, a second neural network that generates, from an initial patch of the input image, a respective second score for each of the object categories that represents a likelihood that the initial patch contains an image of an object belonging to the object category, and an initial patch locator neural network that generates a predicted location of the initial patch of the input image from features of the low-resolution image and from the first scores for the input image, the operations comprising:

obtaining a first training image, wherein the first training image includes an image of a first object from a first object category;

obtaining current parameter values for parameters of the first neural network, parameters of the second neural network, and parameters of the initial patch locator neural network;

down-sampling the first training image to generate a low-resolution first training image;

processing the low-resolution first training image using the first neural network to generate a plurality of features of the low-resolution first training image and first scores for the low-resolution first training image in accordance with the current values of the parameters of the first neural network;

processing the first scores for the low-resolution first training image and the features of the low-resolution first training image using the initial patch locator neural network to generate an initial location of an initial patch of the first training image in accordance with current values of the parameters of the initial patch locator neural network;

locally perturbing the initial location to select an adjusted location for the initial patch of the first training image from among a plurality of candidate locations in the first training image; and updating the current values of the parameters of the initial patch locator neural network to generate updated values using the adjusted location, wherein processing the first scores for the low-resolution first training image and the features of the low-resolution first training image using the initial patch locator neural network in accordance with the updated values of the parameters of the initial patch locator neural network generates an alternative predicted location having a smaller distance from the adjusted location than a distance between the predicted location and the adjusted location.

18. The computer storage medium of claim 17, the operations further comprising:

performing an iteration of a stochastic gradient descent training procedure on the loss function while fixing the values of the initial patch locator neural network to generate updated values of the parameters of the first neural network and the second neural network while maintaining the updated values of the parameters of initial patch locator neural network.

19. The computer storage medium of claim 18, wherein the loss function satisfies, for the first training image X:

$$L(\theta_0,\theta_1;X,z,y^*)=E_0(\overline{X},y^*;\theta_0)+E_1(X(z),y^*;\theta_1)+\lambda/2\|l^{P^1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{P^1}$ is the initial location, $\overline{X}$ is the low-resolution first training image, $y^*$ is the known label of the first training image, $\lambda$ is a positive constant value, $E_0(\overline{X},y^*;\theta_0)$ is a cross-entropy error of the low-resolution network, $E_1(X(z),y^*;\theta_1)$ is a cross-entropy error of the initial patch neural network, and $\|l^{P^1}-z\|^2$ measures the distance between the alternate location z and the predicted location $l^{P^1}$.

20. The computer storage medium of claim 18, the operations further comprising:

obtaining a second training image; and performing another iteration of the stochastic gradient descent training procedure on the loss function using the second training image, comprising:

down-sampling the second training image to generate a low-resolution second training image;

processing the low-resolution second training image using the first neural network to generate first scores for the low-resolution second training image in accordance with the updated values of the parameters of the first neural network;

processing the first scores for the low-resolution second training image and the features of the low-resolution second training image using the initial patch locator neural network to generate an initial location of an initial patch of the second training image in accordance with the updated values of the parameters of the initial patch locator neural network;

locally perturbing the initial location of the initial patch of the second training image to select an adjusted location for the initial patch of the second training image;

providing the adjusted location for the initial patch of the second training image as the location of the initial patch in the second training image in place of the predicted location of the initial patch in the second training image;

processing the initial patch in the second training image located at the reference location using the second neural network to generate second scores for the initial patch in the second training image; and combining the first scores and the second scores to generate respective third scores for the training image, wherein the respective third score for each category represents a likelihood that the training image includes an image of an object from the category.

21. The computer storage medium of claim 17, wherein locally perturbing the predicted location to select an adjusted location for the initial patch of the first training image comprises:

identifying a plurality of candidate locations in the training image;

determining a respective value of the loss function for each of the candidate locations, wherein determining the value of the loss function for the candidate location comprises computing a value of the loss function with the candidate location replacing the predicted location; and selecting a candidate location that has a smallest respective value of the loss function of any candidate location as the adjusted location.

22. The computer storage medium of claim 21, wherein the plurality of candidate locations are locations in a grid of locations centered at the predicted location in the training image.

23. The computer storage medium of claim 21, wherein the loss function satisfies, for the first training image X:

$$L(\theta_0,\theta_1;X,z,z^-,y^*)=E_0(\bar{X},y^*;\theta_0)+E_1(X(z),y^*;\theta_1)+E_1(X(z^-),y^*;\theta_1+\lambda/2\|l^{p_1}-z\|^2$$

wherein $\theta_0$ denotes parameters of the low-resolution neural network, $\theta_1$ denotes parameters of the initial patch neural network, $X(z)$ is the high resolution patch extracted at the alternate location z, $l^{p_1}$ is the initial location, $\bar{X}$ is the low-resolution first training image, $y^*$ is the known label of the first training image, $\lambda$ is a positive constant value, $E_0(\bar{X},y^*;\theta_0)$ is a cross-entropy error of the low-resolution network, $E_1(X(z),y^*;\theta_1)$ is a cross-entropy error of the initial patch neural network, $\|l^{p_1}-z\|^2$ measures the distance between the alternate location z and the predicted location $l^{p_1}$, $z^-$ is a most-offending candidate location of the plurality of candidate locations, and $E_1(X(z^-),y;^*\theta_1)$ is a cross-entropy loss at the most-offending candidate location.

24. The computer storage medium of claim 23, wherein computing a value of the loss function with the candidate location replacing the predicted location comprises computing candidate category scores for the first training image with the candidate location replacing the predicted location, and wherein the method further comprises:

identifying as the most-offending candidate location a candidate location having a highest category score for any incorrect category among any category score for any incorrect category computed with any of the plurality of candidate locations replacing the predicted location.

* * * * *